April 23, 1968 E. K. KAPRELIAN 3,379,095

METHOD OF AND MEANS FOR RECORDING AND REPRODUCING SOUND

Filed Dec. 17, 1963 8 Sheets-Sheet 1

INVENTOR.
EDWARD K. KAPRELIAN
BY Hane and Nydick
ATTORNEYS

METHOD OF AND MEANS FOR RECORDING AND REPRODUCING SOUND

INVENTOR.
EDWARD K. KAPRELIAN
BY Hane and Nydick
ATTORNEYS

INVENTOR.
EDWARD K. KAPRELIAN
BY Hane and Nydick
ATTORNEYS

METHOD OF AND MEANS FOR RECORDING AND REPRODUCING SOUND

Filed Dec. 17, 1963 8 Sheets-Sheet 4

INVENTOR.
EDWARD K. KAPRELIAN
BY Hane and Nydick
ATTORNEYS

April 23, 1968 E. K. KAPRELIAN 3,379,095

METHOD OF AND MEANS FOR RECORDING AND REPRODUCING SOUND

Filed Dec. 17, 1963 8 Sheets-Sheet 5

INVENTOR
EDWARD K. KAPRELIAN
BY Hane and Nydick
ATTORNEYS

METHOD OF AND MEANS FOR RECORDING AND REPRODUCING SOUND

Filed Dec. 17, 1963 8 Sheets-Sheet 6

INVENTOR.
EDWARD K. KAPRELIAN
BY Hane and Nydick
ATTORNEYS

INVENTOR
EDWARD K. KAPRELIAN
BY Haseltine and Nydick
ATTORNEYS

INVENTOR.
EDWARD K. KAPRELIAN
BY Hane and Nydick
ATTORNEYS

United States Patent Office 3,379,095

Patented Apr. 23, 1968

3,379,095

METHOD OF AND MEANS FOR RECORDING AND REPRODUCING SOUND

Edward K. Kaprelian, Rte. 3, Box 14, Joppa, Md. 21085

Filed Dec. 17, 1963, Ser. No. 331,183
29 Claims. (Cl. 88—28)

This invention relates to the recording and reproducing of sound on film and is directed to a method of and means for superimposing a sound track over a picture area in such a manner that neither the sound track nor the picture interfere with each other.

In the existing systems where still or motion pictures are provided with a cooperating sound track, the pictures and the sound track are side by side. In motion pictures the sound track occupies a linear area along one or the other edge of the picture frames, and in some cases where a pluarlity of tracks are employed the tracks may be placed adjacent both edges. In the case of still pictures with accompanying sound, such as those known under the trademark "Soundstrip," the sound track occupies an area between adjacent picture frames in the manner shown in U.S. Patent No. 2,925,753, or an area of recording material which accompanies the picture and is adjacent the latter as in the slide arrangement of U.S. Patent 2,961,922.

It is obvious that in such arrangements some appreciable portion of the film is and must be occupied by the sound track, the percentage depending, in motion pictures, upon the width of the film and the number of sound tracks, and in still pictures with integrated sound upon the length of the sound frame relative to the length of the picture frame.

It is an object of this invention to provide a maximum of picture area in combination with a maximum of sound area by superimposing the two areas.

It is a further object of this invention to provide a means for integrating with a projection transparency, photograph or the like, the sound track relating to said transparency or photograph.

It is a further object of this invention to provide a means for reproducing such an integrated, superimposed sound track.

These and other objects, features and advantages of the invention will be apparent in the specification and claims and in the accompanying drawings of several preferred embodiments of the invention in which FIG. 1 shows an arrangement of the prior art showing picture and sound on adjacent frames.

Figure 1:
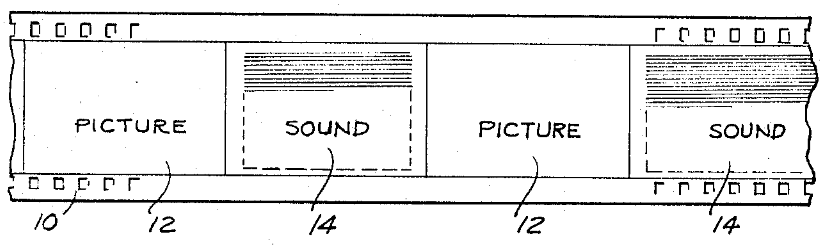

FIG. 1 shows a combined picture and sound track strip of the prior art. A film base 10 preferably of standard 16 mm., 35 mm. or 70 mm. width carries alternate picture areas 12 and photographic sound track areas 14. As each picture is projected on the screen the corresponding sound track is reproduced by a pickup head in the manner described in aforementioned U.S. Patent 2,925,753.

Figures 2, 3, 4, 5, 6:
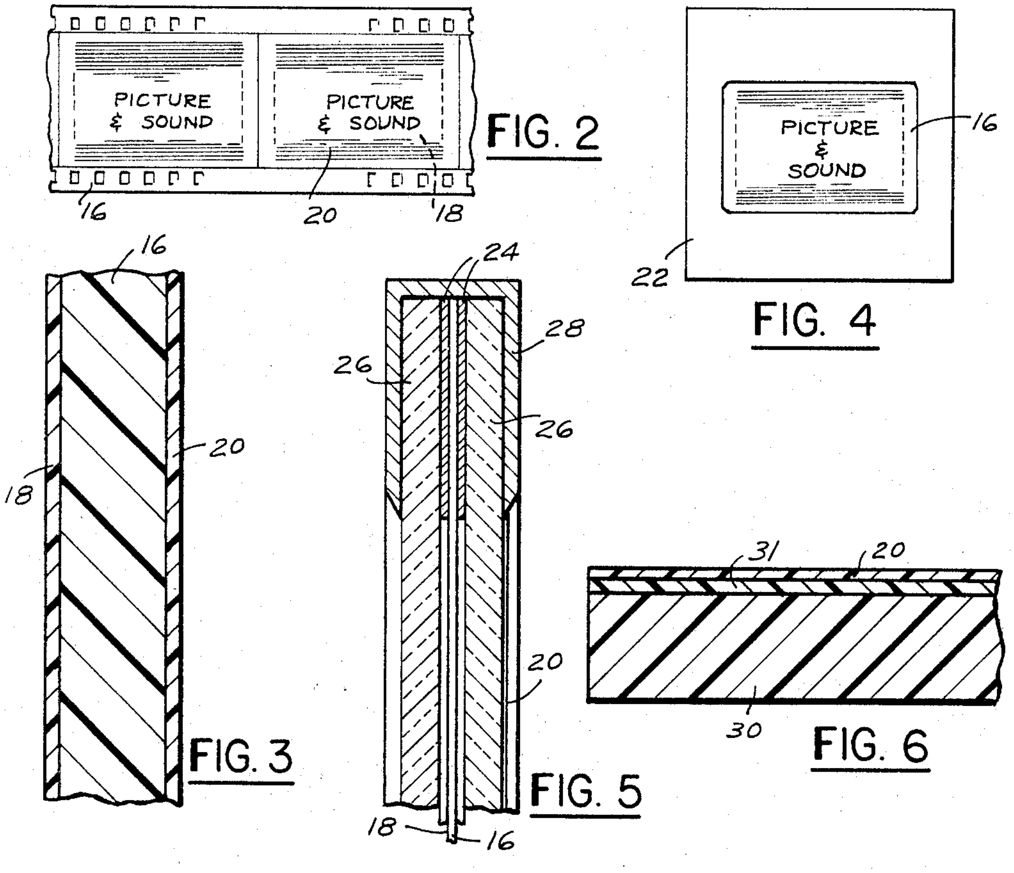
FIG. 2 shows superimposed still pictures and sound track on strip film.
FIG. 3 shows a cross sectional view of a film of the type of FIG. 2 carrying a picture area and a sound track area on opposite sides of a base.
FIG. 4 shows a conventional paper mounted picture and sound track.
FIG. 5 shows in cross section a portion of a transparency holder having the sound track area on the cover glass.
FIG. 6 shows in cross section a reflection-type print having the sound track area immediately overlying the picture area.

FIGS. 2 and 3 show in plan and in vertical cross section, respectively, a film strip made in accordance with the invention. Here the film base 16 is provided with a color emulsion layer 18 carrying the picture. On the opposite side of the film base is the sound track area 20 comprising a layer of a material which is transparent to visible light and which does not interfere with the projection or viewing of the picture.

The strip of FIG. 2 may be cut into individual picture-sound-track frames and mounted in the conventional paper mount 22 as shown in FIG. 4 for individual projection.

Another form of the superimposed picture and sound track is shown in FIG. 5. In this modification the film, comprising the base 16 and the image layer 18 is assembled in a more or less conventional slide mount. The usual mask 24 centers and delineates the image frame, and cover glasses 26 protect the film. A body member 28 retains the various components in their proper relationship. In this modification the transparent sound track 20 is carried on a surface of one of the cover glasses as shown.

FIG. 6 shows the employment of a superimposed sound track on ordinary photographs or reflection prints. The conventional opaque base 30 carries the usual picture layer 31 over which is superimposed the transparent sound track layer 20.

Figure 7:
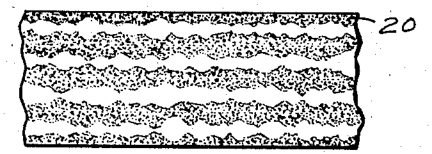
FIG. 7 shows an example of variable area recording of linear sound track.
Figure 8:
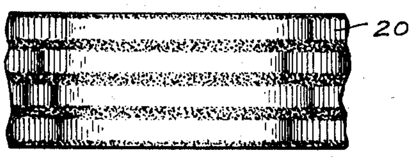
FIG. 8 shows an example of variable density recording of linear sound track.

The sound track itself may take a number of forms. With respect to modulation, it may be of the variable area type shown in FIG. 7 or of the variable density type shown in FIG. 8. With respect to configuration, the track may be linear as shown in FIGS. 7 and 8, in the form of stacked arcuate segments as in FIG. 9 or in the form of a spiral as in FIG. 10.

A variety of materials may be used for the sound track 20. Among the substances which are transparent to visible light but opaque to infra-red radiation are thin layers of stannic oxide ($SnO_2$), stannic chloride ($SnCl_4$), cupric chloride ($CuCl_2$) and thin evaporated layers of silver or gold. The color films with which these materials would cooperate are quite transparent to the infrared radiation in the 0.8 to 2.0 micron wavelength range over which the present invention preferably operates. Sound track 20 can also comprise a layer of birefrigent material such as extruded cellulose acetate film. A layer of sheet polarizer material is also suitable and multiple layer interference films can also be used.

In each case it is necessary to modify the more or less uniform transparent layer by altering its optical characteristics during the recording process in accordance with the modulation of the sound being recorded. In many instances an extension of optical sound recording techniques may be employed as in the example of FIGS. 11 to 15.

Figure 11:
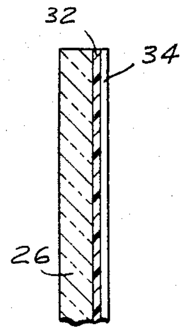
FIG. 11 shows the first step in the production of one type of sound track.
Figure 12:
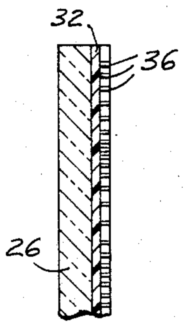
FIG. 12 shows a step in the technique of FIG. 11.
Figure 13:
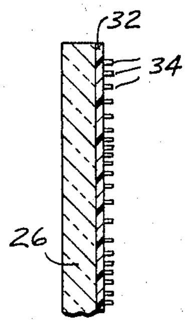
FIG. 13 shows another step in the technique of FIG. 11.
Figure 14:
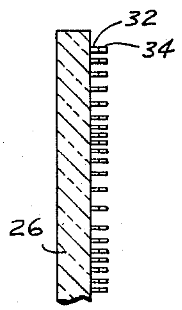
FIG. 14 shows another step in the technique of FIG. 11.
Figure 15:
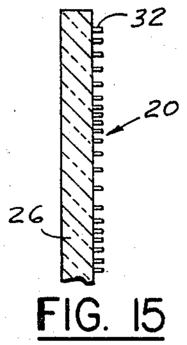
FIG. 15 shows another step in the technique of FIG. 11.

FIG. 11 shows a uniform stannic oxide layer 32 applied to a slide cover glass 26 in preparation for the application of typical photo resist techniques. A photographic emulsion 34 is applied over the stannic oxide layer in the usual manner. The emulsion is then either exposed to a light modulator as in conventional sound track recording, or is exposed through a photographic negative of the sound track. The emulsion selectively hardens at the exposed areas 36 as in FIG. 12, the unexposed portions are next washed away to uncover the layer beneath as in FIG. 13, and the resulting exposed surfaces of the stannic oxide layer are etched away for instance with potassium hydroxide as in FIG. 14. The hardened resist is next removed with a solvent such as alcohol, ether, carbon tetrachloride or acetone, leaving behind a sound track 20 of stannic oxide as in FIG. 15. Similar techniques may be employed with stannic chloride, cupric chloride and evaporated metal films, using suitable solvents and such etchants for metals as nitric acid or hydrochloric acid.

Figure 16:
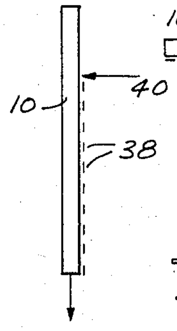
FIG. 16 represents diagrammatically the first step of another technique in the production of a sound track.
Figure 17:
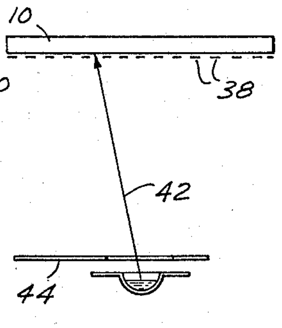
FIG. 17 shows a step in the technique of FIG. 16.
Figure 18:
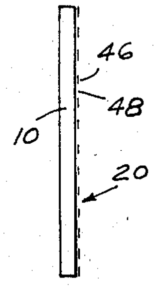
FIG. 18 shows another step in the technique of FIG. 16.

As shown in FIGS. 16 to 18, xerographic techniques may also be employed for producing the sound track, by first applying onto the film 20 or cover glass in FIG. 16 an invisible electrostatic image 38 of the track to be recorded by means of an electron gun 40 and evaporating a thin layer of silver or gold onto the charged surface as in FIG. 17. Depending upon whether the silver vapor 42 is charged to the same or opposite sign relative to the charge on the surface by means of a charged electrode 44, the track will be recorded as either a positive or negative image. The difference in light transmission between the metal coated portions 46 and the uncoated portions 48 of the resultant sound track shown in FIG. 18 is so slight as to be unnoticeable to the eye, while the ratio in the infrared region can be as great as two orders of magnitude.

Figure 19:
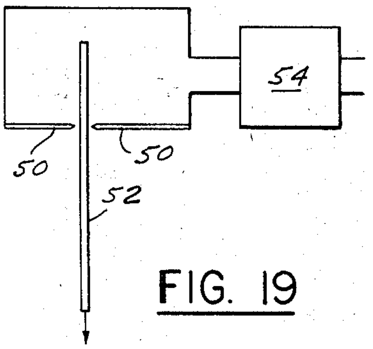
FIG. 19 shows another technique for producing a sound track.

The birefringence of extruded cellulose acetate can be altered in the track area by the application of heat; wherever the film has been heated it will lose its birefringence. FIG. 19 shows a sound track made by passing an electric discharge, modulated by means of a high voltage modulator 54 in accordance with the sound to be recorded, between a pair of needles 50, one on each side of a sheet of cellulose acetate 52 while the latter is in motion. This change, invisible in ordinary light, is visible as a sharply defined sound track when the film is used with a polarizer and analyzer.

Other techniques for producing an invisible sound track are also feasible. For example, by controlling either the deposition of a multiple layer interference filter on the film or glass surface or by the selective removal of portions of a uniform filter layer in accordance with the modulation pattern of the sound to be recorded, a useful sound track will be produced which although substantially unnoticeable in visible light acts effectively to modify the transmission or reflection of infrared light. Still another method of producing an invisible sound track is to etch away, in accordance with the sound track pattern desired, portions of a uniform quater-wave plate layer deposited on glass. When used with circularly polarized polarizing filters a reproduceable sound track is produced.

Another type of usable sound track can be produced by employing the thermoplastic recording technique described by W. E. Glenn in the Journal of the Society of Motion Picture and Television Engineers, vol. 69, No. 9, pp. 577–580. In using this method the sound track is first recorded as an electrostatic image either on the thermoplastic film base or on a film of suitable thermoplastic material. When the thermoplastic material is subjected to heating by the means described in the article the surface of the thermoplastic material is deformed in accordance with the value and location of the charge. The resultant pattern, although not affecting the projection of the picture on which it is superposed, can be scanned as a sound track.

Figure 10:
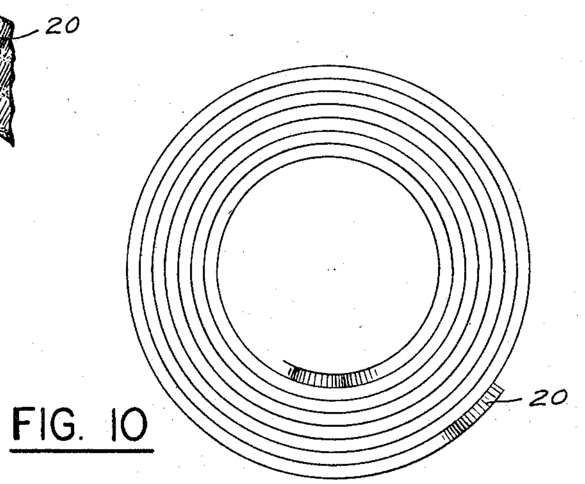
FIG. 10 shows an example of spirally recorded track.
Figure 20:
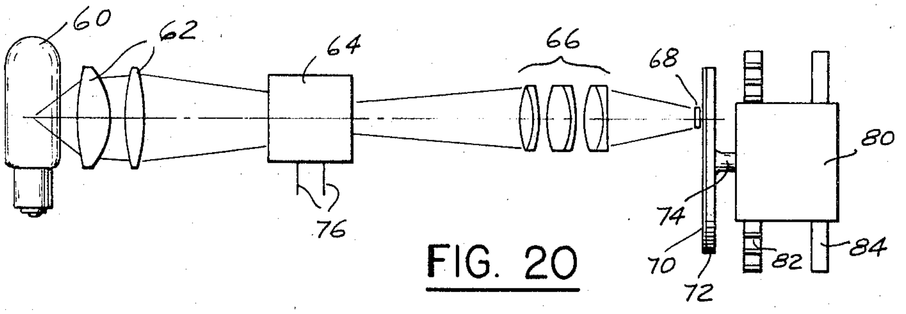
FIG. 20 shows a recorder for recording a spiral sound track.

FIG. 20 shows diagrammatically a device for producing the spiral sound track shown in FIG. 10. Light from a suitable source such as lamp 60 is collected by a condenser system 62 and directed to a recording galvanometer or light valve 64 which receives through leads 76 an electrical signal corresponding to the sound to be recorded. The modulated output of galvanometer 64 is imaged by a lens system 66 through a cylindrical lens 68 onto a light sensitive surface 70 carried on a disc 72. The light sensitive surface may be a piece of film, a prepared recording surface such as shown at 34 in FIG. 11 or other medium for producing transparent sound tracks. Disc 72 is rotated through a shaft 74 driven by a motor in a housing 80 which simultaneously provides the disc 72 with a linear motion through the action of a rack 82, a screw or other suitable drive means associated with a track 84 on which housing 80 is carried.

In the operation of the recorder of FIG. 20 the sound to be recorded is fed to galvanometer 64 and the motor drive for housing 80 and shaft 74 is energized. As the modulated light pattern falls on light sensitive surface 70 the latter is simultaneously rotated by shaft 74 and translated linearly on track 84. The resulting track pattern is that of a spiral as shown in FIG. 10. Either variable area or variable density track can be produced, and the recorded spiral may have its start at either the inside or the outside as desired. The track generating mechanism comprising the rotational and translational motion components are used in a similar manner for producing the track shown in FIG. 19 in spiral form as well as other non-optically produced spiral tracks.

Figure 9:
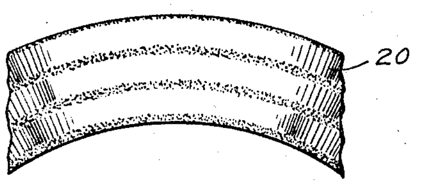
FIG. 9 shows an example of arcuate recorder track.
Figure 21:
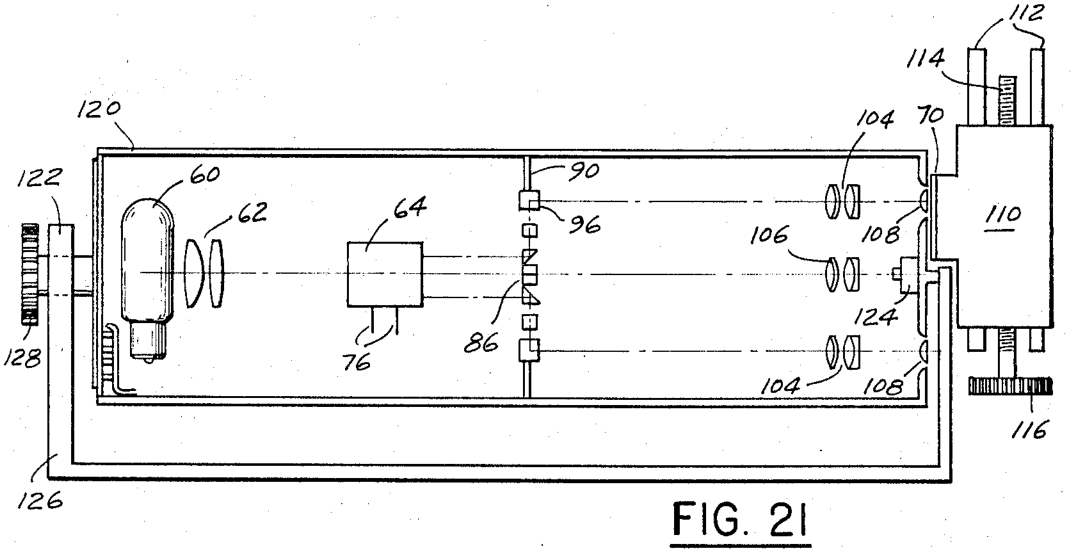
FIG. 21 shows a recorder for recording an arcuate sound track.
Figure 22:
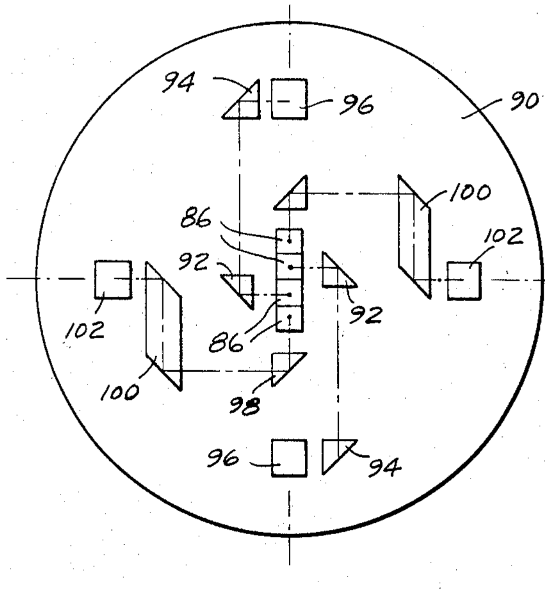
FIG. 22 is a view of the prism plate of the recorder of FIG. 21.

FIG. 21 is a diagrammatic showing of a recorder for producing arcuate sound tracks of the type shown in FIG. 9. Light from lamp 60 and a condenser lens system 62 similar to that of FIG. 20 is modulated by galvanometer 64. The light passing through the galvanometer is divided into four equal portions by a linear prism array 86 which is mounted on plate 90 and shown in detail in FIG. 22. The portions of light form two pairs of divergent beams, each beam being 90° apart from its neighbor as seen along the lamp-condenser-galvanometer axis. Referring to FIG. 22, it will be seen that the light from the slit in galvanometer 64 entering the four prisms 86 is shared equally by the latter. The two outermost prisms 86 direct the light in succession to prisms 98, 100 and 102. The action of these prisms is such that the gavlanometer slit is seen in prims 102 as a horizontal line, that is, radial to the optical axis of the lamp, condenser and galvanometer. The two innermost prisms 86 direct light outwardly to prisms 92, 94 and 96 in succession. The action of this group of prisms is such that the galvanometer slit is seen in prisms 96 as vertical lines, that is, radial to the optical axis of the lamp, condenser and galvanometer.

The beams of light leaving prisms 96 and 102 are parallel to the previously described optical axis and are received by spaced objective lenses 104 and 106 respectively and are directed onto cylindrical lenses 108, the axes of which are radial with respect to the lamp-condenser-galvanometer axis. The light passing through the optical systems forms four identical radial slit images of the gavlanometer slit, the images being spaced 90° apart and falling in the common plane of focus of the four cylindrical lenses 108.

The image plane coincides with that of a layer of light sensitive material 70 which is supported on a carriage 110 riding on rails 112 and capable of linear movement on said rails in response to the action of screw 114 driven by gear 116. The entire assembly of lamp, condenser, galvanometer, prisms and lenses is covered by a casing 120 and is mounted on bearings 122 and 124 of frame 126 for rotation about the lamp-galvanometer axis. The assembly is rotated through gear 128 in synchronism with the movement of carriage 110 through the action of a motor and any one of several well known mechanical means for coupling gears 116 and 128, not shown.

In the operation of the recorder of FIG. 21, the lamp, galvanometer and drive motor are energized. The modulated light for recording appears at the focal planes of each of cylindrical lenses 108 and each of the 4 modulated light images traverse an identical arcuate path. The width of the recording area 70 is made slightly greater than the 90° chord length between adjacent optical systems. Thus with the modulator system rotating and the carriage 110 slowly moving along rails 112 the entire message is recorded on surface 70. As each succeeding lens 108 comes into recording position at the beginning of an arcuate sweep the preceding lens system leaves the far edge of the surface to yield the track shown in FIG. 9 Obviously any number of lens systems in excess of four could be used if desired. In place of the prism arrangement a system of mirrors and beam splitters could be used.

FIGS. 23 to 26 show a recorder arrangement employed to produce the linear track of FIGS. 7 and 8 which is based on the combination of a glow modulator tube and a mechanical scanner. The recorder comprises a pair of drums 140 and 142 having sprocket teeth 144 and carrying thereon an endless web 146 of thin stainless steel or opaque film base material which is held in engaging position with drums 140 and 142 by means of an idler roller 148. Web 146 carries a plurality of spaced light transmitting slits 150 of one to five thousandths of an inch width along its length, the spacing between the slits being fixed in relationship to the length of each row of the linear sound track to be produced.

Overlying the web and spaced a distance of several thousandths of an inch therefrom is a linearly movable mask plate 152 carrying an inclined light transmitting slit 154. The slit may be one to five thousandths of an inch in width and is as long as the spacing between the slits 150. If desired, slit 154 may be inclined with respect to the direction of movement of slits 150 to the extent that its right end is displaced downwardly by the amount of its width, i.e., the top of the right end of slit 154 at the same level as the bottom of the left end of the slit. This arrangement will produce a track in which the individual lines are not slanted.

Figures 23, 24:
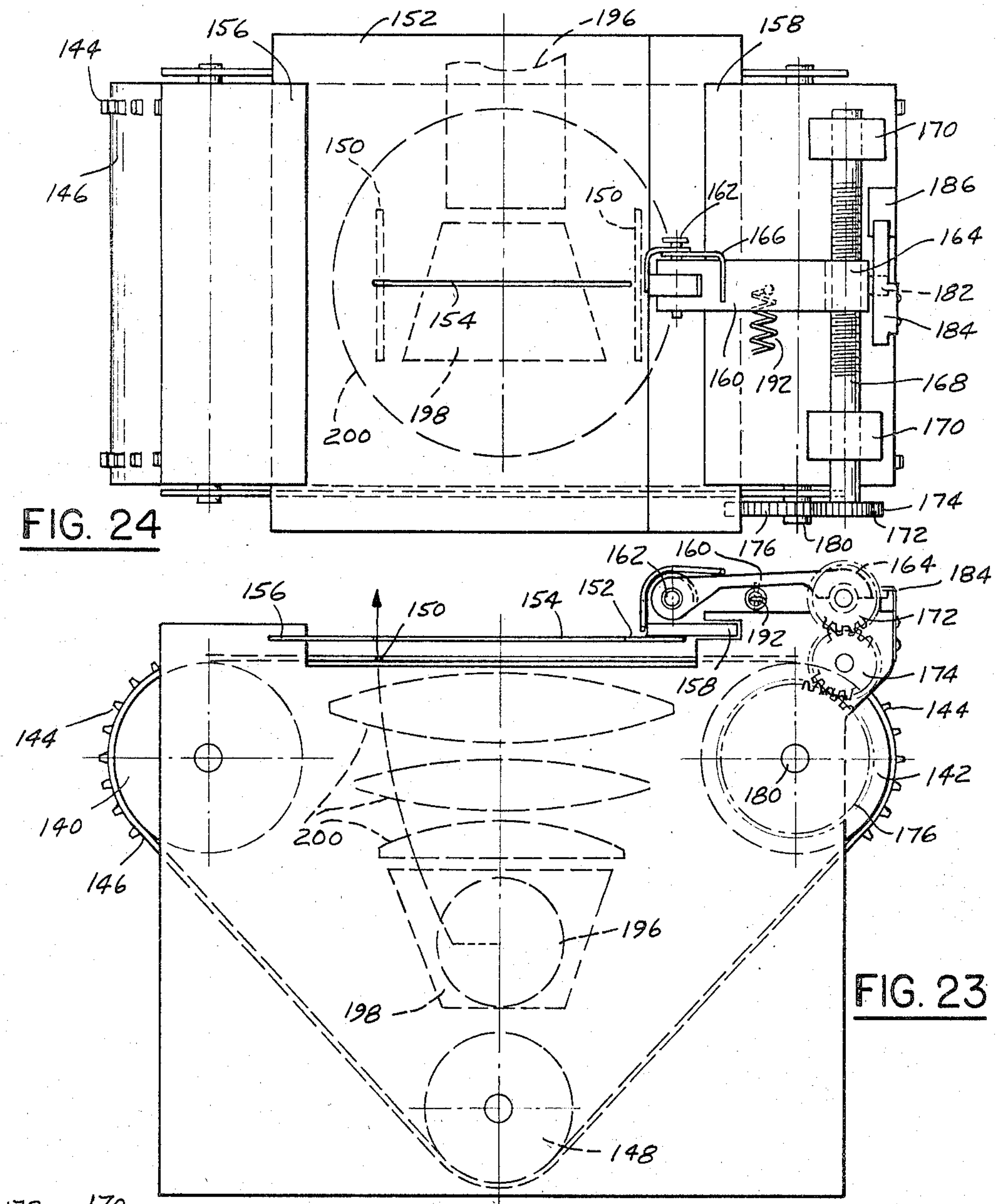
FIG. 23 shows in side elevation a recorder for recording a linear sound track.
FIG. 24 is a plan view of the recording head of FIG. 23.

Plate 152 is mounted in ways 156 and 158 to permit its movement at right angles to the direction of motion of belt 146. This movement is achieved by means of a hinged arm 160 pivoted at one end by pin 162 and carrying at its other end a half nut 164. A spring 166 urges arm 160 downward as shown in FIG. 24, causing nut 164 to engage the top half of a screw 168 carried by bearings 170. Screw 170 is connected through gears 172, 174 and 176 to shaft 180 on drum 142. Gear 176 is driven by a synchronous motor, not shown.

Arm 160 carries at its end a projection 182 which is normally held beneath the horizontal surface of a spring 184 so as to insure engagement of half nut 164 and screw 168. As arm 160 moves from the lower position of FIG. 24 toward an upper position projection 182 is lifted by a cam 186, shown in profile in FIG. 25, so as to lift projection 182 above the slightly turned-down end 188 of spring 184. A slightly turned-up portion 190 at the other end of spring 184 insures reengagement of projection 182 after arm 160 has been urged into its most downward position, in the view of FIG. 24, by spring 192 shown in part in this figure.

The moving slits are illuminated from below by means of a glow modulator lamp 196 the light from which is directed upwardly by a right angle mirror 198 into the short conjugate end of a collimator objective shown diagrammatically at 200. The design and relationship of lens 200 and lamp 196 are such that lamp 196 fills the entire exit pupil of lens 200 with light and illuminates the area swept by the slits.

In operation, the motor, not shown, causes web 146 to be driven around the drums in a clockwise direction, simultaneously causing plate 152 to move upwardly through the action of screw 168. The drive ratio is so chosen as to permit slit 154 to move upwardly, in the view of FIG. 24, a distance equal to or slightly greater than its own width during the traverse of one of slits 150 along the length of slit 154. When plate 152 has moved to a point just beyond the top of slit 150 in the view of FIG. 24 cam 186 lifts nut 164 from engagement with screw 168, projection 182 rides along the top of spring 184, and arm 160 and plate 152 are moved downwardly through the action of spring 192 to a position where slit 154 is just below the lower end of slit 150. At this point projection 182 drops off the end 190 of spring 184 and nut 164 reengages screw 168.

Figure 26:
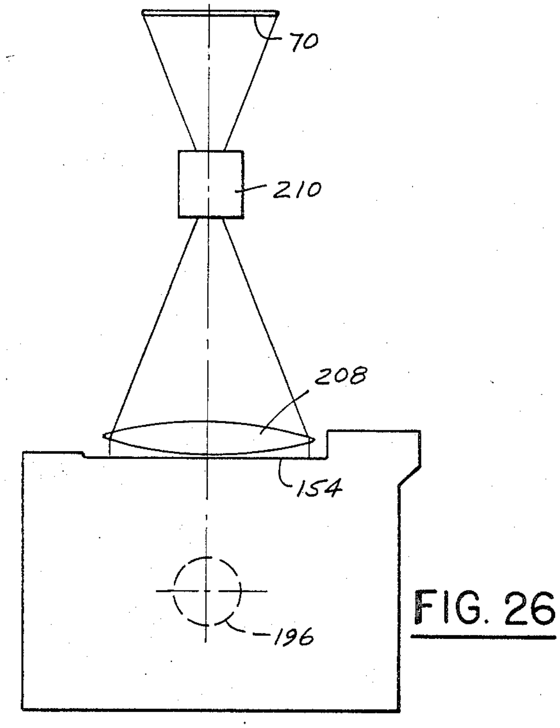
FIG. 26 shows diagrammatically the optical arrangement for printing from the recording head of FIG. 23.

During this action the small opening common to both slits 150 and 154 describes a horizontal raster of scanning lines through which light from glow modulator lamp 148 passes. The light from lamp 148 is modulated in accordance with the message to be recorded; as a result the brightness of the raster lines varies in accordance with the message. FIG. 26 shows the relationship of the linear scan recorder to the light sensitive surface on which the linear track is to be recorded. Light from slits 150 and 154 is directed by a field lens 208 to a projection objective 210 which focuses the modulated light onto the recording surface 70. The sound track dimensions recorded on recording surface 70 may be larger, equal to or smaller than the scan dimensions established by the motion of slits 150 and 154.

Figure 27:
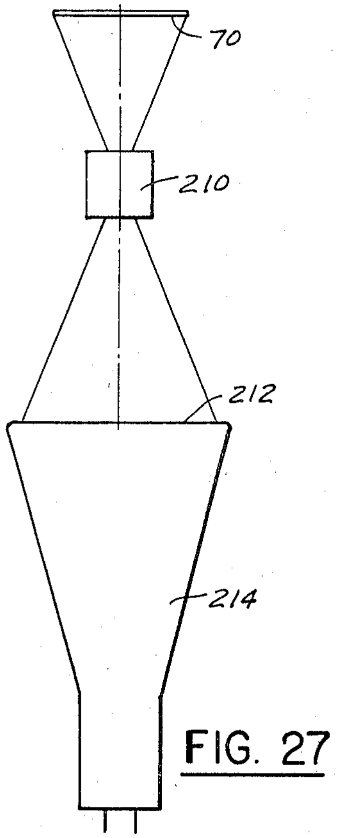
FIG. 27 shows diagrammatically the optical arrangement for printing a linear track from a cathode ray tube.

Another arrangement for producing a linear scan is shown in FIG. 27. Here the raster lines on the face 212 of a cathode ray tube 214 are imaged by a lens 210 onto light sensitive layer 70. The flying spot is modulated in the usual manner and the writing speed, raster length and raster spacing are selected to produce the desired sound track configuration. It is possible also to so modify the scanning as to produce arcuate or spiral tracks if desired.

Other means of a purely optical nature are suitable for producing the linear sound track. Typical of the systems which can be employed is that employing two rotating multi-faceted mirrors with their axes of rotation at right angles. The modulated light reflects from the two synchronously driven mirrors in succession, the mirror with the vertical axis providing the horizontal scan and the mirror with the horizontal axis providing the vertical displacement of the scan lines. It is also possible to employ the diasporometer, a pair of aligned oppositely rotating wedges, to provide a linear scan.

Figures 28, 29, 30:
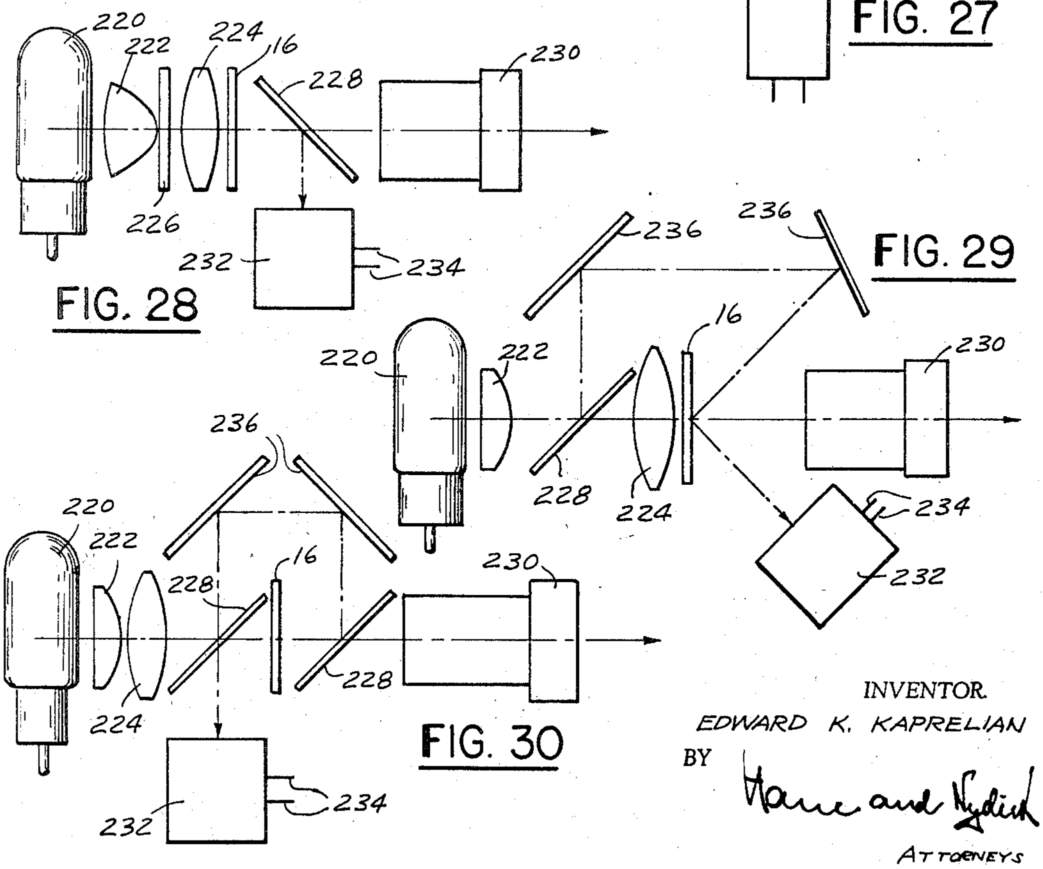
FIG. 28 is a diagrammatic view of one form of optical arrangement for projection and sound reproduction from a diapositive.
FIG. 29 is a diagrammatic view of another arrangement for projection and sound reproduction from a diapositive.
FIG. 30 is a diagrammatic view of still another arrangement for projection and sound reproduction from a diapositive.

FIG. 28 shows diagrammatically one arrangement for projecting a slide and reproducing the sound track carried thereon. A projection lamp 220 and condenser lenses 222, 224 illuminate slide 16. A heat filter 226 absorbs or otherwise removes from the light beam infrared radiation longer than 1.5 or 2 microns. Light for projection passes through interference filter 228 and enter projection lens 230. Filter 228 reflects infrared radiation in the approximately one micron wavelength range into pickup head 232, to be described, where the sound track is reproduced as an electrical signal and fed through conductors 234 to an amplifier and speaker, not shown.

FIG. 29 shows diagrammatically a projection and sound pickup system for a transparency having thereon a reflection sound track. Here visible light from lamp 220 passes through condenser 222, condenser 224, and slide 16 to lens 230 in order to form the projected image. Infrared light of approximately one micron wavelength is reflected by interference filter 228 to fully reflecting mirrors 236 and at an angle onto the sound track surface of slide 16. The light is reflected from the sound track surface into pickup 232 in a manner otherwise similar to that shown in FIG. 28.

In FIG. 30 visible light from lamp 220 passes through condensers 222 and 228, first interference filter 228, slide 16, second interference filter 228 and lens 230 to form the projected picture. Infrared radiation is reflected by first interference filter 228, fully reflecting mirrors 236, and second interference filter 228, is then transmitted through slide and sound track 16 and reflected again by first interference filter 228 downwardly into the pickup head 232.

Figure 31:
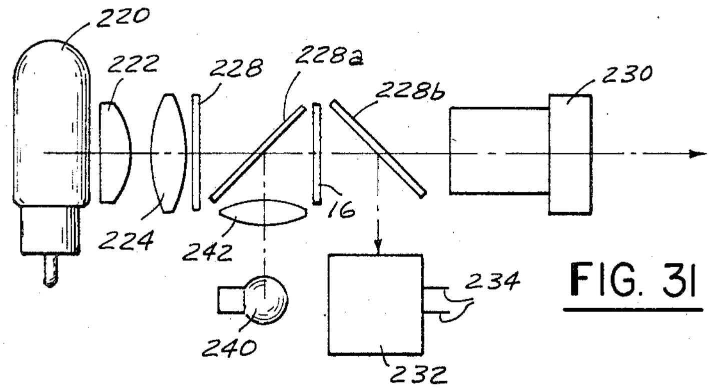
FIG. 31 shows diagrammatically a diapositive projection system having a separate lamp for sound reproduction.

In FIG. 31 visible light from lamp 220 passes through condensers 222 and 224, through infrared reflecting interference filter 228, through second interference filter **228*a*, transparency 16, third interference filter 228*b* and projection lens 230 to form an image of the picture on transparency 16. The sound track is independently illuminated by a separate lamp 240. Light from lamp 240 is collimated by lens 242 into a substantially parallel bundle which is reflected by infrared reflecting interference mirror 228*a* through the sound track on slide 16 and reflected by interference filter 228*b* into pickup head 232**.

Figures 32, 33, 38:
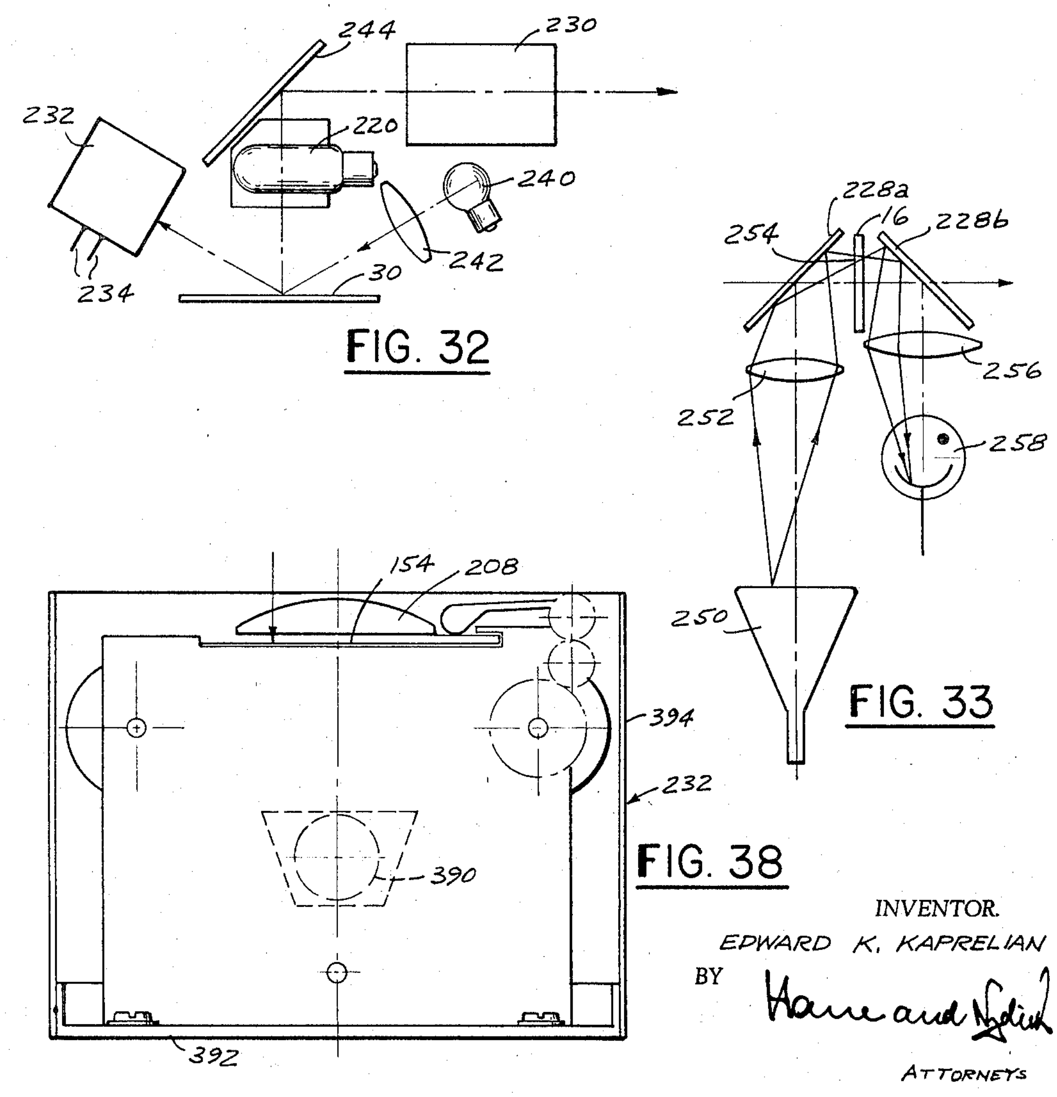
FIG. 32 shows diagrammatically an arrangement for projection and sound reproduction from a reflection print.
FIG. 33 shows diagrammatically an alternative sound reproduction arrangement for the system of FIG. 31 in which a flying spot scanner is used as the sound reproduction light source.
FIG. 38 is a view in partial elevational section of a pickup head for reproducing a linear sound track.

FIG. 32 shows an arrangement for projecting reflection prints employing customary episcopic projection means. Print 30 is illuminated by one or more lamps 220 having suitable reflectors and the light reflected by print 30 is reflected by the usual mirror 244 through lens 230 onto a screen, not shown. The sound track on print 30 is illuminated by an independent lamp 240 and collimator lens 242 in a manner similar to that employed in the modification of FIG. 31 and the light reflected from the sound track is received by pickup head 232.

Each of the projection and sound head arrangements described thus far employ a fixed, constant light source and rely for this scanning action on an active scanning element in the pickup head. It is however, also possible, as shown in FIG. 33 to scan the track with a moving light beam and receive the light modulated by the track on a fixed photoelectric cell. In FIG. 33 the stationary light source and pickup head of FIG. 31 have been replaced by a stationary photocell. A flying spot scanner tube 250 having a finely focused spot is provided with horizontal and vertical deflection circuits such that the spot follows a path corresponding to that of the sound track on slide 16. A lens 252 re-images the flying spot onto the sound track as at 254, the light being reflected by interference filter **228*b* into collector lens 256 and into photocell 258. It will be obvious to those skilled in the art that any of the recorders shown in FIGS. 20 to 25 can be adapted to function similarly to tube 250**.

The pickup heads 232 shown in FIGS. 28 to 32 may take a variety of forms. All of the various pickup heads to be described have in common one important characteristic, that of being able to reproduce a sound track which is positioned a relatively long distance away. In the usual sound reproduction system the sound track is positioned in one conjugate plane of a relatively short focal length lens, the spacing between the track and the closest optical surface of the pickup head being measured, as a rule, in hundredths of inches. This permits achieving the good optical resolution necessary for wide frequency reproduction through relatively simple optics.

It is obvious that in the practice of the present invention it is not possible to place the optical pickup elements in substantial contact with the track without at the same time interfering with the picture on the slide or photograph. Depending upon the size of the film and the picture-track area carried by it the track to pickup distance in the present invention vary from approximately one inch for 16-mm.-wide film and 2¼ inches for 35-mm. film in 2 inch by 2 inch mounts to 8 inches or more for large transparencies and prints. Quality reproduction of a fixed sound track located several inches from the pickup head requires means for accurately scanning the sound track and telescopic means for reading the variations of track density or width with high resolution. Equally important is the accurate positioning of the sound track itself.

Figures 34, 35:
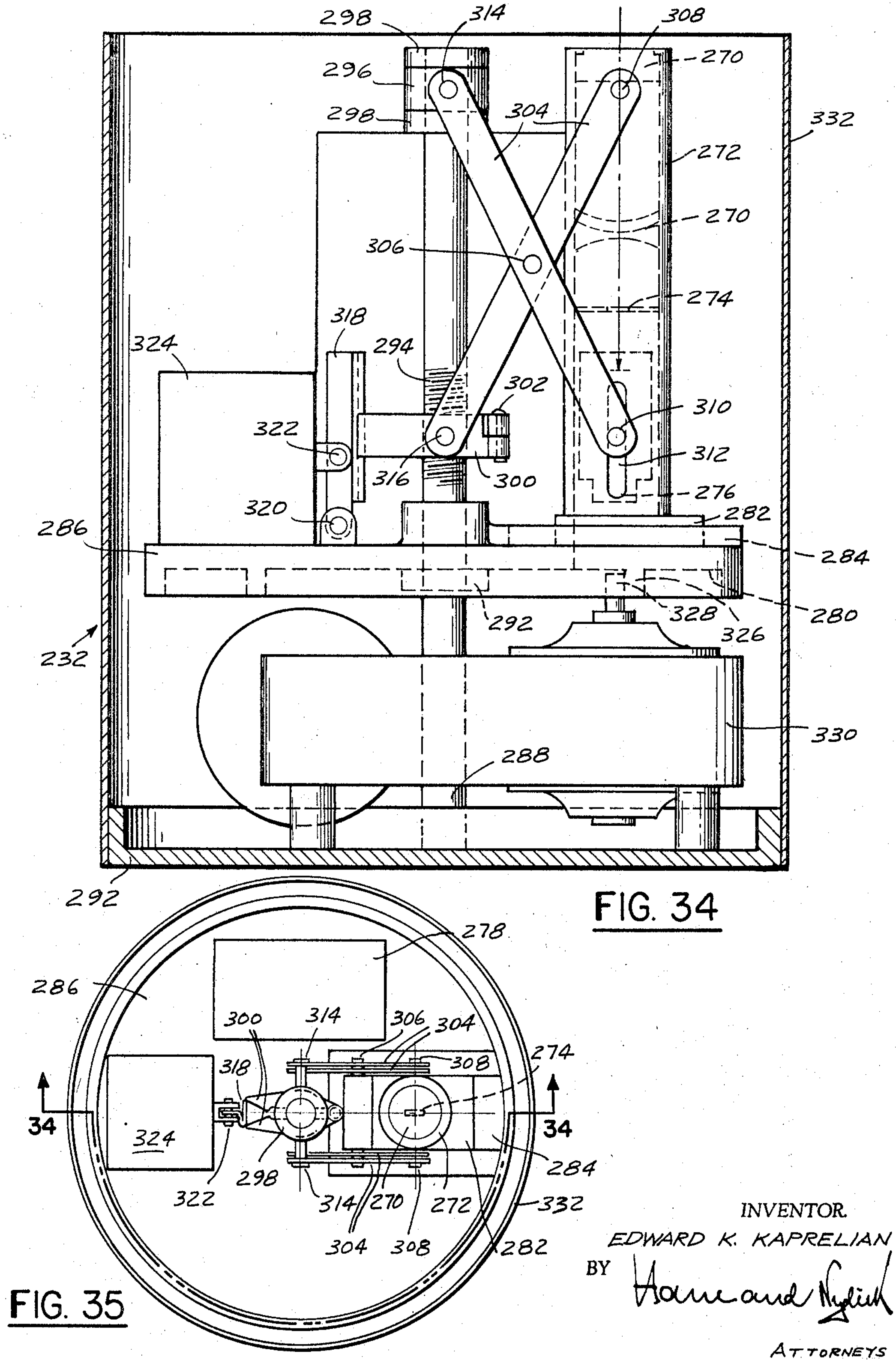
FIG. 34 shows in vertical section a pickup head for a spiral sound track.
FIG. 35 is a plan view of the pickup head of FIG. 34.

FIGS. 34 and 35 show one form of pickup head for reproducing sound from spiral tracks. In this arrangement a pickup lens system 270 in the pickup head 232 is positioned in a vertical tube 272 and arranged in the projector so as to receive the light passing through or reflected by the sound track of a transparency 16 as shown in FIGS. 28 to 32. Light from the track is focused by lens 270 on a slit 274 at its focal plane, light passing through the slit being received by a phototube 276 the output of which is amplified by a preamplifier 278 and brought to any suitable amplifier and speaker through slip ring means located at 280, and through brushes, not shown. Tube 272 is provided with a foot portion 282 slidably carried within a radial slot 284 in plate 286 for providing properly restrained guidance.

Plate 286 is supported rotatably on a vertical post 288 fastened into a base portion 290. A collar 292 positions plate 286 vertically and acts as the vertical load bearing. A portion of post 288 is provided with threads as at 294. Positioned at the upper end of post 288 is a sleeve 296 rotatable about post 288 and vertically restrained by upper and lower collars 298. Carried on threaded portion 294 is a split nut 300, the two halves being hinged together at one end by a pin 302. Two pairs of levers 304 of equal length pivoted at their centers by pins 306 are attached at one of their sides to pins 308 and 310 as shown. Pins 308 are fastened to the upper end of tube 272 and pins 310 are slidably carried in slots 312 at the lower end of tube 272. The other ends of levers 304 are attached at the top to pins 314 carried by sleeve 298 and at the bottom to pins 316 carried by split nut 300. Nut 300 is normally urged into closed engaging position with threads 294 by the inherent springiness of levers 304; this engagement action may be augmented by use of a suitable spring if desired.

The ends of nut 300 opposite their hinge point are shaped so as to form a pair of cooperaing, partially open jaws. A lever 318 pivoted by a pin 320 and positioned so as to be just clear of the jaws in normal condition, is attached by means of pin 322 to the operating plunger of a solenoid 324. Solenoid 324 receives power for its operation through conventional slip rings, not shown, carried in the annular portion 280 beneath a plate 286. Plate 286 also carries a depending circular flange 326 which is engaged by a driving capstan 328 of motor 330. The entire assembly is surrounded by a cover member 332.

In operation, pickup head 232 is initially in start position, with nut 300 engaged at its lowermost position and with tube 272 in its corresponding closest position to rod 288. When motor 330 is energized it causes plate 286 to rotate in a counter clockwise direction, as seen in FIG. 35. As plate 286 rotates, nut 300 climbs upwardly on threads 294 causing tube 272 to gradually move further away from post 288. The pitch of threads 294 and the action of levers 304 are chosen so as to result in a spiral motion of tube 272 which causes the optical axis of the lens system it carries to follow the spiral sound track on the slide. The conjugates of lens 308 and the width of slot 274 are so chosen as to provide the required degree of resolving power at the sound track. The conjugate ratio can be altered favorably by utilizing a lens arrangement 270 of the telephoto type whereby the nodal points are much closer to the sound track than are the lens elements themselves.

At the end of the spiral scan operation solenoid 324 is operated either by a limit switch responding to the radial movement of tube 272, or by the action of a timer to force lever 318 between the jaws of split nut 300. The opening of nut 300 causes it to disengage from threads 294 and reassume its lowermost position either as a result of gravitational action or the urging of an appropriately placed spring, not shown. Suitable cycling means, such as shown in U.S. Patents 2,961,922 and 3,001,030, may be employed for slide or frame changing, recycling the pickup head and other purposes.

Figure 36:
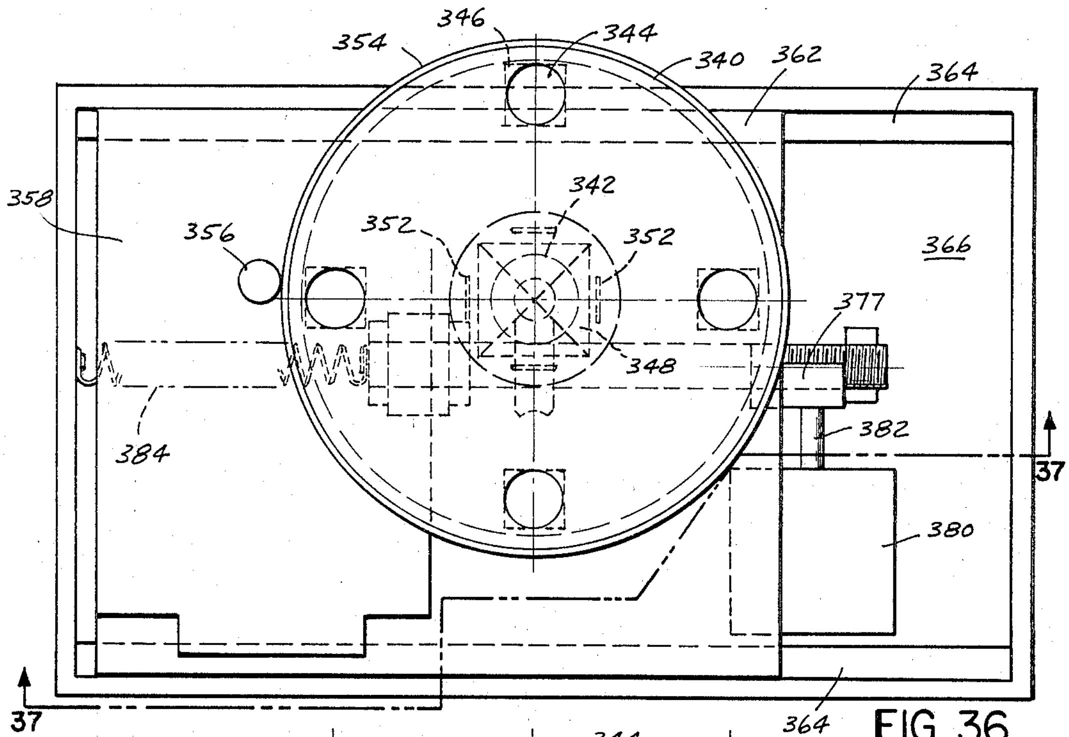
FIG. 36 is a plan view of a pickup head for reproducing an arcuate sound track.
Figure 37:
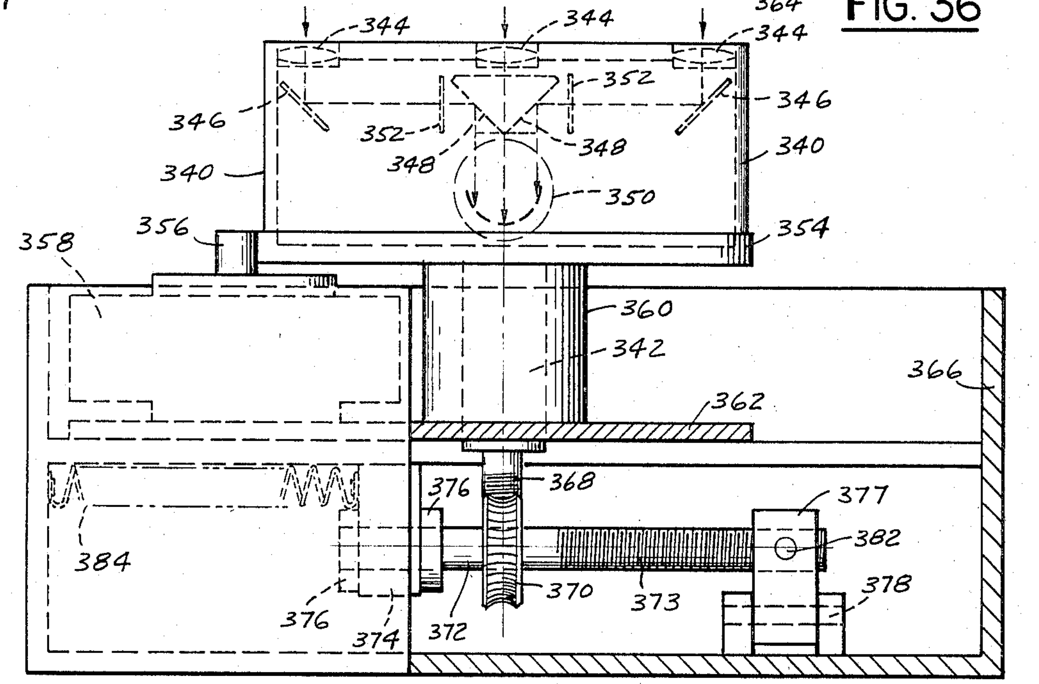
FIG. 37 is an elevation view of the pickup head of FIG. 36 in partial section.

FIGS. 36 and 37 show a modification of the pickup head of FIGS. 28 to 32 for arcuate recording tracks of the type shown in FIG. 9. In this modification the scanning head comprises a drum 340 mounted for rotation about a vertical shaft 342 and provided with four objectives 344 spaced 90° apart. Each objective has immediately behind it a 45° mirror 346 which redirects light from the objective radially inwardly toward a group of 45° mirrors 348 which reflect the light downwardly into a photocell 350. Photocell 350 is connected by leads and slips rings to an amplifier and speaker, not shown. Interposed between mirrors 346 and 348 are light slit masks 352. Around the lower periphery of drum 340 is a raised circumferential portion 354 against which is pressed for frictional contact the spindle 356 of a motor 358. Motor 358 and bearing 360 for shaft 342 are supported on a carriage member 362 the lower surface of which is slidably supported on a pair of spaced rail members 364 shown as part of the pickup head base 366.

Shaft 342 carries at its lower end a worm gear 368 which is in engagement with a worm wheel 370. Worm wheel 370 is connected to and drives shaft 372 which is supported at one end in a bearing sleeve 374 attached to carriage 362, the shaft being restrained from axial movement by a pair of collars 376. Shaft 372 carries a threaded portion 374 which is engaged by a half nut 377 pivoted at its lower end about a pin 378. A solenoid 380 is connected to half nut 377 by a rod 382 in such fashion that a spring in solenoid 380 urges nut 377 into engagement with threads 374 when the solenoid is not energized. Energization of the solenoid causes half nut 377 to be withdrawn from engagement with the threads. Carriage 362 is urged toward the left by the action of spring 384.

In operation of the pickup head of FIGS. 36 and 37 the carriage is in its leftmost position. When motor 358 is energized spindle 356 rotates drum 340 about the axis defined by shaft 342. As drum 340 rotates, worm wheel 370 rotates screw 374 resulting in the linear movement of carriage 362 and drum 340 from left to right. The combined rotational and translational movements results in a path for the axes of objectives 344 which matches the configuration of the arcuate track. Inasmuch as only one of the four objectives is effectively a part of the total optical path at any one time it is obviously necessary to mask the entrance of light to the pickup head to avoid spurious pickup and background noise. This is accomplished readily by use of an opaque mask overlying and spaced slightly from lenses 344. The mask has a 90° arcuate opening, the center of radius of the arc falling on the axis of rotation of drum 340.

Figure 25:
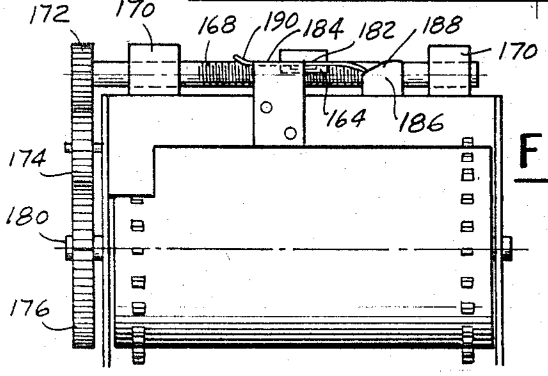
FIG. 25 is a side view of a portion of the recording head of FIG. 23.

FIG. 38 shows a pickup head 232 for linear recordings of the type shown in FIGS. 7 and 8 which employs the structure of the linear recorder of FIGS. 23 to 25. In this pickup head the glow modulator tube of the recorder is replaced by a photocell 390 and the light path is correspondingly reversed, with field lens 208 assuring that light enters the slit in a direction parallel to the optical axis. The mechanism is mounted on a base plate 392 and is surrounded by a light shield 394.

What is claimed is:

1. In a combined picture and sound track, a picture portion which is transparent to non-visible radiation and a superposed sound track portion which is transparent to visible radiation.

2. A picture having an accompanying sound track comprising a picture support surface carrying a picture area and a superposed sound track area, said picture area being transparent to infrared radiation and at least partly opaque to visible radiation, and said sound track area being transparent to visible radiation and at least partly opaque to infrared radiation.

3. A picture as claimed in claim 2, said sound track area overlying said picture.

4. A picture as claimed in claim 2, said sound track area being carried on the face of the support surface opposite that carrying said picture area.

5. A sound track structure for recorded sound comprising an image layer transparent to infrared radiation, a sound track layer overlaying said image layer comprising a material transparent to visible radiation and opaque to infrared radiation, and a sound track pattern defined in said sound track layer by a physical alteration in the structure of said sound track layer.

6. A sound track structure as claimed in claim 5, said alteration in structure comprising a total absence of sound track material.

7. A sound track structure as claimed in claim 5, said alteration in structure comprising a partial absence of sound track material.

8. A sound track structure as claimed in claim 5, said track layer material consisting of stannic chloride.

9. A sound track structure as claimed in claim 5, said track layer material consisting of stannic oxide.

10. A sound track structure as claimed in claim 5, said track layer material consisting of cupric chloride.

11. A sound track structure as claimed in claim 5, said track layer material consisting of evaporated gold.

12. A sound track structure as claimed in claim 5, said track layer material consisting of evaporated silver.

13. A sound track structure for recorded sound comprising an image layer transparent to infrared radiation, a sound track layer overlaying said image layer comprising a material transparent to visible radiation, and a sound track pattern in said sound track comprising an alteration in the optical characteristics of said material.

14. A sound track structure as claimed in claim 13, said track layer material consisting of a layer of birefringent extruded cellulose acetate.

15. A sound track structure as claimed in claim 14, said alteration in optical characteristics comprising loss of birefringence of the cellulose acetate layer.

16. A sound track structure as claimed in claim 13, said track layer material consisting of a quarter wave plate in the wavelength between 0.8 micron and 1.2 microns.

17. A sound track structure as claimed in claim 16, said alteration in the characteristics comprising removal of said quarter wave plate.

18. A sound track structure as claimed in claim 13, said track layer material consisting of a layer of thermoplastic material.

19. A sound track structure as claimed in claim 18, said alteration in characteristics comprising surface deformations resulting in diffraction in the infrared spectrum.

20. A method for reproducing the sound from a transparency having an image portion and a superimposed optical sound track portion comprising illuminating the transparency with a radiating light source, separating from the light image transmitted by said transparency that portion corresponding to the sound track, and scanning said portion with an optical sound pickup means.

21. A method for reproducing the sound from a combined pictorial and sound record having an image portion and a superimposed optical sound track portion, comprising illuminating the record from a light source, receiving that part of the light from the image portion into a projection lens and receiving that part of the light from the sound track portion into an optical sound pickup means.

22. A method for reproducing sound from a combined pictorial and sound record having a light transmitting image portion and a superimposed light transmitting sound track portion, comprising illuminating said record with a light source having portions of its spectrum separately affected by said image portion and by said sound track, and separating the light transmitted by said record into an image producing portion and a sound track producing portion, and receiving the sound track producing portion into an optical sound pickup means.

23. A method for reproducing sound from a combined pictorial and sound record having a light transmitting image portion and a light transmitting sound track portion, comprising illuminating said record with light affected by said image portion, receiving the light affected by said image portion in a projection lens, illuminating said record with light affected by said sound track portion, and receiving the light affected by said sound track portion in an optical sound pickup means.

24. A method for reproducing sound as claimed in claim 23, said record receiving the light which is affected by the image portion from a direction different from that which the light affecting the sound track portion is received.

25. A method for reproducing sound as claimed in claim 23, the light affected by said sound track portion being received in said sound pickup means by reflection from said sound track portion.

26. A method for reproducing sound from a combined pictorial and sound record having a light reflecting image portion and a light reflecting sound track portion, comprising illuminating said record with light affected by said image portion, receiving through reflection from said image portion the light affected by said image portion and directing said light into a projection lens, receiving through reflection from said sound track portion the light affected by said sound track portion, and directing said light into an optical sound pickup means.

27. A method for reproducing sound from a combined pictorial and sound record having an image portion affecting visible light of a given characteristic and a superimposed sound track portion affecting light of a different characteristic, comprising illuminating said image portion with image portion affecting light from a first source, illuminating said sound track portion with sound track portion affecting light from a second source, receiving said light from said image portion into a projection lens and receiving said light from said sound track portion into an optical sound pickup means.

28. A method for reproducing sound as claimed in claim 27, the light to said projection lens and to said pickup means being received from said record by reflection.

29. A method for reproducing sound from a combined pictorial and sound record having an image portion and a superimposed sound track portion, comprising illuminating said record with light for said image portion from a first illumination source, illuminating said sound track portion with light from a second illumination source said second source comprising a cathode ray tube having a light emitting flying spot and lens means for focusing an image of said flying spot on said sound track portion, and a photocell for receiving light transmitted by said sound track portion.

References Cited

UNITED STATES PATENTS

| | | | |
|---|---|---|---|
| 1,931,025 | 10/1933 | Keith | 274—5 |
| 1,962,310 | 6/1934 | Jones | 274—41.6 |
| 2,036,554 | 4/1936 | Thomas | 274—5 |
| 2,228,643 | 1/1941 | Rudkin | 274—46 |
| 2,261,410 | 11/1941 | Perez | 179—100.3 |
| 2,496,943 | 2/1950 | Hutchinson | 179—100.3 |
| 3,046,836 | 7/1962 | Schwartz et al. | 88—28 |
| 3,191,494 | 6/1965 | Schwartz et al. | 88—28 |

OTHER REFERENCES

Journal of the Society of Motion Picture and Television Engineers, vol. 66, No. 9, September 1957, pages 517–522, "The Infrared Transparency of Magnetic Tracks," Lewin.

NORTON ANSHER, *Primary Examiner.*

R. A. WINTERCORN, *Assistant Examiner.*